United States Patent
Fukuda et al.

(10) Patent No.: US 10,592,542 B2
(45) Date of Patent: Mar. 17, 2020

(54) DOCUMENT RANKING BY CONTEXTUAL VECTORS FROM NATURAL LANGUAGE QUERY

(71) Applicant: International Business Machines Corporation, Armonk, NY (US)

(72) Inventors: Takashi Fukuda, Tokyo (JP); Hiroaki Kikuchi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 15/691,956

(22) Filed: Aug. 31, 2017

(65) Prior Publication Data

US 2019/0065505 A1 Feb. 28, 2019

(51) Int. Cl.

| G06F 16/00 | (2019.01) |
|---|---|
| G06F 16/33 | (2019.01) |
| G06F 17/28 | (2006.01) |
| G06F 16/242 | (2019.01) |
| G06F 16/2457 | (2019.01) |
| G06F 17/27 | (2006.01) |

(52) U.S. Cl.
CPC ........ *G06F 16/3347* (2019.01); *G06F 16/243* (2019.01); *G06F 16/24575* (2019.01); *G06F 16/3334* (2019.01); *G06F 17/2785* (2013.01); *G06F 17/2818* (2013.01)

(58) Field of Classification Search
CPC ........... G06F 16/3347; G06F 16/24575; G06F 16/951; G06F 16/00; G06F 16/24578; G06F 16/382; G06F 16/3346; G06F 17/2785; G06F 17/2828; G06F 17/3069; G06F 17/30528; G06F 17/30401; G06F 17/30; G06F 16/3334; G06F 17/2818; G06G 16/243

See application file for complete search history.

(56) References Cited

U.S. PATENT DOCUMENTS 5,963,940 A * 10/1999 Liddy ................ G06F 16/3329
                                                          707/E17.068
6,026,388 A *  2/2000 Liddy ................ G06F 16/3329
                                                          707/E17.068

(Continued)

OTHER PUBLICATIONS

Mikolov et al., Distributed Representations of Words and Phrases and their Compositionality.

*Primary Examiner* — Anh Ly
(74) *Attorney, Agent, or Firm* — Garg Law Firm, PLLC; Rakesh Garg; Reza Sarbakhsh

(57) ABSTRACT

A set of keywords is extracted from a query. Natural Language Processing (NLP) is performed on the query to extract a set of contextual words for a keyword from the query. For the query, a first score of a first vector is computed, where the first vector represents a first contextual word. For a first result in a result set, a first result score of a first result vector is computed, where the first vector represents a first result contextual word in a set of result contextual words corresponding to the keyword in the first result. Using the first score and the first result score, a first similarity value is computed for the first result. The first result is re-ranked relative to a second result according to the first similarity value for the first result and a second similarity value for the second result in the result set.

19 Claims, 12 Drawing Sheets

(56) References Cited

U.S. PATENT DOCUMENTS

| | | | |
|---|---|---|---|
| 6,269,368 B1* | 7/2001 | Diamond | G06F 16/3329 707/E17.074 |
| 8,060,497 B1* | 11/2011 | Zatsman | G06F 16/951 707/723 |
| 8,126,883 B2 | 2/2012 | Qiu | |
| 2002/0152202 A1* | 10/2002 | Perro | G06F 16/3334 707/E17.071 |
| 2003/0069873 A1* | 4/2003 | Fox | G06F 16/338 707/E17.108 |
| 2003/0078766 A1* | 4/2003 | Appelt | G06F 16/3338 704/9 |
| 2006/0026152 A1* | 2/2006 | Zeng | G06F 16/951 707/E17.108 |
| 2007/0299862 A1* | 12/2007 | Aggarwal | G06F 16/40 707/E17.009 |
| 2008/0077570 A1* | 3/2008 | Tang | G06F 16/3344 707/E17.108 |
| 2010/0094846 A1* | 4/2010 | Rouhani-Kalleh | G06F 16/353 707/705 |
| 2010/0268708 A1* | 10/2010 | Zhang | G06F 16/24578 707/726 |
| 2011/0087673 A1* | 4/2011 | Chen | G06F 16/951 707/748 |
| 2014/0149401 A1* | 5/2014 | Liu | G06F 16/319 707/723 |
| 2014/0280088 A1* | 9/2014 | Speer | G06F 16/3347 707/723 |
| 2015/0293976 A1 | 10/2015 | Guo et al. | |
| 2016/0232160 A1* | 8/2016 | Buhrmann | G06F 17/2247 |
| 2017/0075877 A1* | 3/2017 | Lepeltier | G06F 17/2705 |
| 2017/0132288 A1 | 5/2017 | Ho et al. | |
| 2017/0161619 A1 | 6/2017 | Franceschini et al. | |
| 2017/0193090 A1* | 7/2017 | Byron | G06F 17/273 |
| 2017/0293680 A1* | 10/2017 | Boguraev | G06F 17/28 |
| 2018/0218734 A1* | 8/2018 | Somech | G10L 15/16 |

\* cited by examiner

PRIOR-ART

DOCUMENT RANKING BY CONTEXTUAL VECTORS FROM NATURAL LANGUAGE QUERY

TECHNICAL FIELD

The present invention relates generally to a method, system, and computer program product for ranking documents in a corpus. More particularly, the present invention relates to a method, system, and computer program product for document ranking by contextual vectors from natural language query.

BACKGROUND

A corpus (plural: corpora) is data, or a collection of data, used in linguistics and language processing. A corpus generally comprises large volume of data, usually text, stored electronically. Hereinafter, unless expressly distinguished where used, a document comprises any data that is available as text, can be converted to text, or is recognizable as text, in some natural language, for the purposes of Natural Language Processing (NLP).

A natural language (NL) is a written or a spoken language having a form that is employed by humans for primarily communicating with other humans or with systems having a natural language interface. Thus, a document contemplated herein can be text, audio data that can be transcribed into text, video data from which textual description or transcription is possible, or some combination thereof.

NLP is a technique that facilitates exchange of information between humans and data processing systems. For example, one branch of NLP pertains to transforming human readable or human understandable content from a document into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

NLP employs techniques such as shallow parsing and deep parsing. Shallow parsing is a term used to describe lexical parsing of a given content using NLP. For example, given a sentence, an NLP engine determining what the sentence semantically means according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information from distant content portions in a given document or a corpus.

Generally, not all documents are equally important, relevant, or useful for a given purpose, or contain equally useful information. Document ranking is a known process of arranging documents in some order of relevance according to a given condition. One known method of document ranking arranges the documents based on the frequency of occurrence of a given word or phrase therein. For example, a search query for "zebra" might result in one hundred documents. These one hundred documents are ranked according to a number of times the word "zebra" appears in them. The highest ranking document will have the most occurrences of the word, and the last ranking document the least.

Another known method of document ranking orders the documents, where the order is indicative of a sentiment expressed in the documents. For example, a search query for "favorable impression of Florida vacation" might find ten documents that each discuss vacation experiences in Florida. These ten documents are ranked by a degree of positive sentiment expressed towards the experience of vacationing in Florida.

SUMMARY

The illustrative embodiments provide a method, system, and computer program product. An embodiment includes a method that extracts a set of keywords from a query. The embodiment performs, for a keyword in the set of keywords, Natural Language Processing (NLP) on the query to extract a set of contextual words from the query. The embodiment computes, for the query, using a processor and a memory, a first score of a first vector, wherein the first vector represents a first contextual word in the set of contextual words. The embodiment computes, for a first result in a result set, a first result score of a first result vector, wherein the first vector represents a first result contextual word in a set of result contextual words corresponding to the keyword in the first result. The embodiment computes, using the first score and the first result score, a first result similarity value for the first result. The embodiment re-ranks, according to the first result similarity value for the first result and a second result similarity value for a second result in the result set, the first result relative to the second result.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
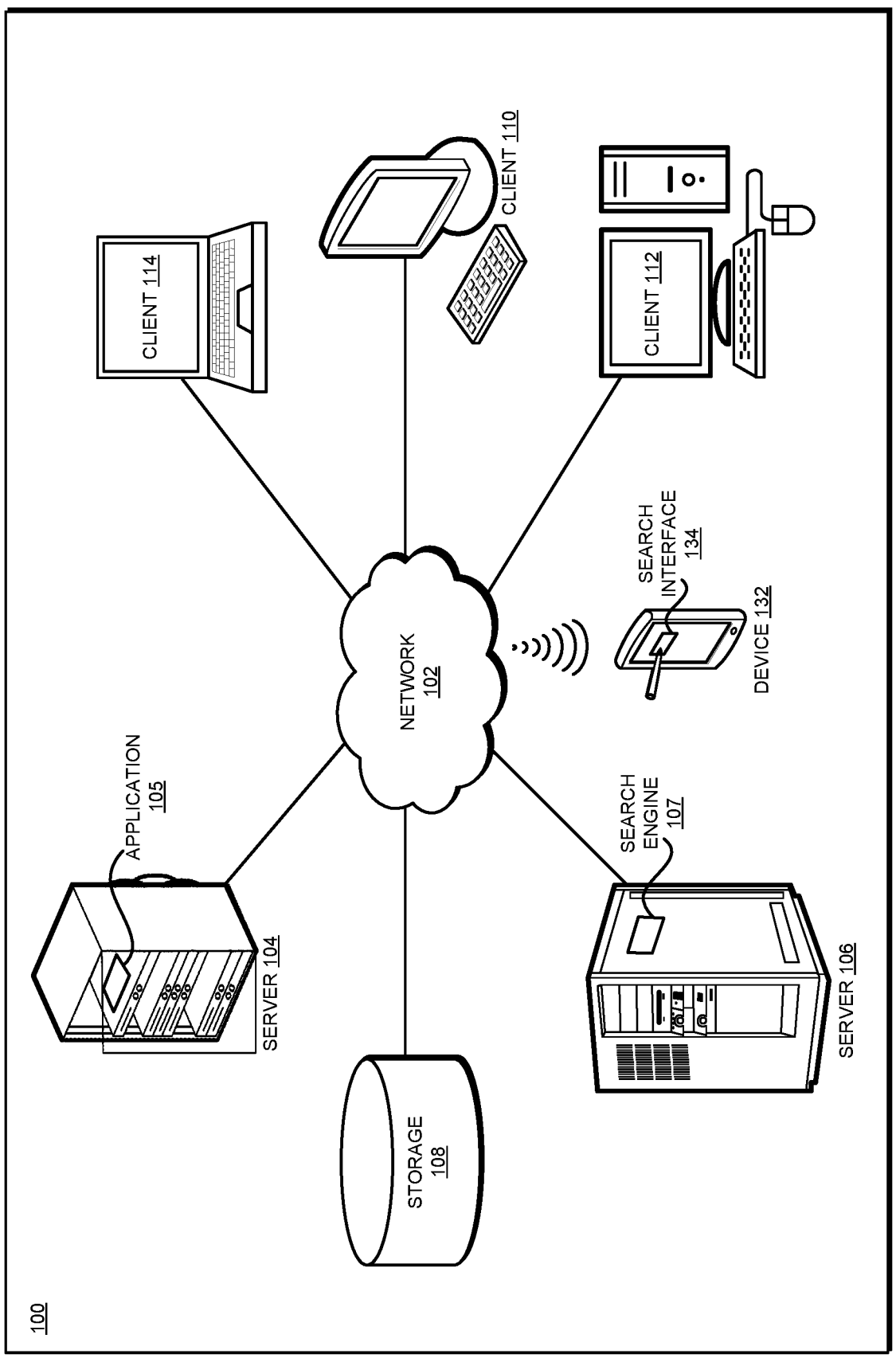
FIG. 1 depicts a block diagram of a network of data processing systems in which illustrative embodiments may be implemented.

The illustrative embodiments recognize that the existing methods of document ranking are deficient in answering many natural language queries. For example, in one case, a user might specify an NL statement for a query, e.g., "I would like to eat a juicy apple" hoping to find information about a fruit that is juicy. The illustrative embodiments recognize that a presently available method for search and ranking of matching documents would include documents that reference references to "apple" without discriminating between document that discuss "apple" as a fruit or a company. Often, the result set returned by the search engines at the very least mix documents that contain the keywords but are irrelevant to the context in which the keyword is used, and the worst populate the highest ranks with documents that have nothing to do with the context of the keyword.

Such a manner of present document ranking is at least frustrating to the user if not entirely defeating the purpose of the search. The illustrative embodiments recognize that this problem is exacerbated when the search queries specified by the user are natural language queries instead of keywords-based queries.

An NL query is a query that takes the form of a spoken or written sentence in a natural language, not necessarily in the form of a question, and not necessarily specifying an intent to perform a search using the sentence. For example, the example sentence used above—"I would like to eat a juicy apple" is a natural language sentence according to the grammar of the English language, is not posed as a question, and may or may not have been typed into a search engine interface—e.g., may be a part of a written or oral conversation the user might be having online.

To be able to understand a portion of an NL conversation or a search query input in a natural language, and be able to search and order the contextually correct information is a difficult and complex computational problem that ordinary computers and presently available search engines are insufficient to solve. Within the scope of the illustrative embodiments, a portion of an NL audio, video, or textual data based on which an embodiment searches and ranks documents is referred to as an NL query, regardless of whether that portion is specified as a search query by the user.

A sentence that forms an NL query includes some keywords and some surrounding words. As a non-limiting example, in many cases according to the grammar of the English language, the keywords may be usually found in the subject or the object in a grammatical structure of the sentence, although the verb and other parts of the sentence (adverbs, adjectives, etc.) may also operate as a keyword under certain circumstances.

Some or all of the surrounding words in the NL query operate to provide context—a frame of reference—to one or more keywords in the NL query. More particularly, a context can be an intention, meaning, limit, definition, purpose, usage, or scope within which the user expects a keyword to operate. For example, in the above example NL query, "I would like to eat a juicy apple," the intent of the user is directed at the fruit and not the company, and this context is communicated by the presence of words and phrases, such as "like to eat" and "juicy," in the NL query.

These examples of the English language and the parts of speech where the keywords and context may be found are not intended to be limiting. From this disclosure, those of ordinary skill in the art will be able to conceive many other languages and parts of NL sentences in those languages from where keywords and contextual information may be extracted, and the same are contemplated within the scope of the illustrative embodiments.

A result set of a search can easily return thousands of documents. The illustrative embodiments recognize that analyzing each document in the result set for contextual relevance is computationally very expensive to the point of being prohibitive. An efficient manner of determining whether a document in a result set is contextually relevant to the NL query is therefore needed.

The illustrative embodiments recognize that the presently available tools or solutions do not address these needs or provide adequate solutions for these needs. The illustrative embodiments used to describe the invention generally address and solve the above-described problems and other problems related to document ranking by contextual vectors from natural language query.

An embodiment can be implemented as a software application. The application implementing an embodiment can be configured as a modification of an existing search engine or document ranking system, as a separate application that operates in conjunction with an existing search engine or document ranking system, a standalone application, or some combination thereof.

A result set can include complete documents, a summarized version of a document, or some combination of both. Hereinafter, unless expressly distinguished where used, a reference to a "result" in a result set is a reference to a document, a summary, or both, as the case may be with a particular result set, with a particular manner of operation of a search engine or search algorithm, or a particular implementation.

Techniques are available presently to vectorize words—i.e., to construct one or more vectors from one or more words, where a vector represents one or more words. Generally, a vector represents a word with a set of numeric values. Neural networks are known to be configurable for vectorizing words.

An embodiment uses NLP to parse an NL query into keywords and contextual words. An NL query may have one or more keywords each of which can have one or more contexts. One embodiment constructs multiple vectors using different combinations of contextual words or phrases, which are deemed valid contexts by an NLP engine.

An embodiment constructs a vector for each context that is found for a keyword. The contexts of one or more keywords can overlap with the contexts of one or more other keywords in the NL query. The embodiment scores a vector.

A score of a vector is a numerical value resulting from applying a function to the numerical values of the vector.

An embodiment performs a search using the NL query. In one embodiment, the keywords from the NL query are sent to a pre-existing search engine. In another embodiment, the entire NL query is sent to the existing search engine. In yet another embodiment, a search algorithm implemented within the embodiment accepts the keywords only or the NL query as a search input.

An embodiment receives a result set in response to performing the search. A result may be included in the result set due to the search engine or search algorithm's determination that the result is relevant to some or all keywords that were used in the search.

An embodiment analyzes a result to detect the presence of a keyword therein. The embodiment analyzes the data surrounding the keyword in the result for determining the context of the keyword in the result. The surrounding data may appear before the keyword, after the keyword, or both. Furthermore, the surrounding data may be immediately adjacent to the keyword, or may be separated from the keyword by other data in the result. In some cases, the surrounding data, which is usable to provide context for a keyword in a result, may be located in another document that is distinct from the result and may or may not be included in the result set.

Additionally, no limit as to the size of the surrounding data, or the distance of the surrounding data from the keyword is implied or necessary for the illustrative embodiments. In one example case, the surrounding data may only be fragment of a sentence, whereas in other cases, the surrounding data may be one or more sentences, one or more paragraphs, or other similarly purposed language-specific structures.

Furthermore, all, some, or none of the keywords from the NL query may be present in a particular result; a keyword from the NL query may be present more or less number of times in a result as compared to in the NL query; a context of a keyword may be different in a result as compared to in the NL query; and the contexts of one or more keywords can overlap with the contexts of one or more other keywords in a result.

For a result, an embodiment constructs a vector for each context found for each keyword in the result. The embodiment scores each contextual vector constructed in this manner. The embodiment aggregates the scores of all contextual vectors for all keywords found in the result. Other results in the result set are processed in a similar manner.

An embodiment compares a context vector of a keyword from the NL query with one or more context vectors of the same or similar keyword from a result. The embodiment compares the vectors that step from the same or similar keywords in the NL query and the result, e.g., by comparing the vector scores but not being limited to that method of comparison. Through this comparison, the embodiment produces a similarity value for the result. Note that the scoring of vectors and comparing the scores is only one non-limiting example method for comparing vectors. Essentially, an embodiment operates to compare one or more vectors, separately or collectively, with one or more vectors of a result, separately or collectively. One embodiment uses a cosine similarity method for determining the similarity between the vectors.

From this disclosure, those of ordinary skill in the art will be able to conceive other ways of adapting an embodiment to compare word vectors of contextual information from an NL query with word vectors of contextual information from a result. Such adaptations are contemplated within the scope of the illustrative embodiments.

Regardless of the ranking assigned to the results by the search engine or search algorithm, an embodiment re-ranks selected results. The re-ranking of the results in the result set can be performed in different ways. One embodiment optionally selects those results from the result set whose similarity values exceed a similarity threshold. Another embodiment selects all the results in the result set.

An embodiment arranges, orders, or ranks the selected results according to their similarity values. For example, the selected result with the highest similarity value is ranked the highest, the selected result with the next highest similarity value is ranked next, and so on. The re-ranked selection of results is output to the user.

The manner of document ranking by contextual vectors from natural language query described herein is unavailable in the presently available methods. A method of an embodiment described herein, when implemented to execute on a device or data processing system, comprises substantial advancement of the functionality of that device or data processing system in computationally efficient re-ranking a result of a result set according to the contextual relevance of the result to the NL query provided by a user.

The illustrative embodiments are described with respect to certain types of searches, queries, words, phrases, contexts, grammars, languages, scores, ranks, thresholds, values, algorithms, search engines, documents, corpora, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
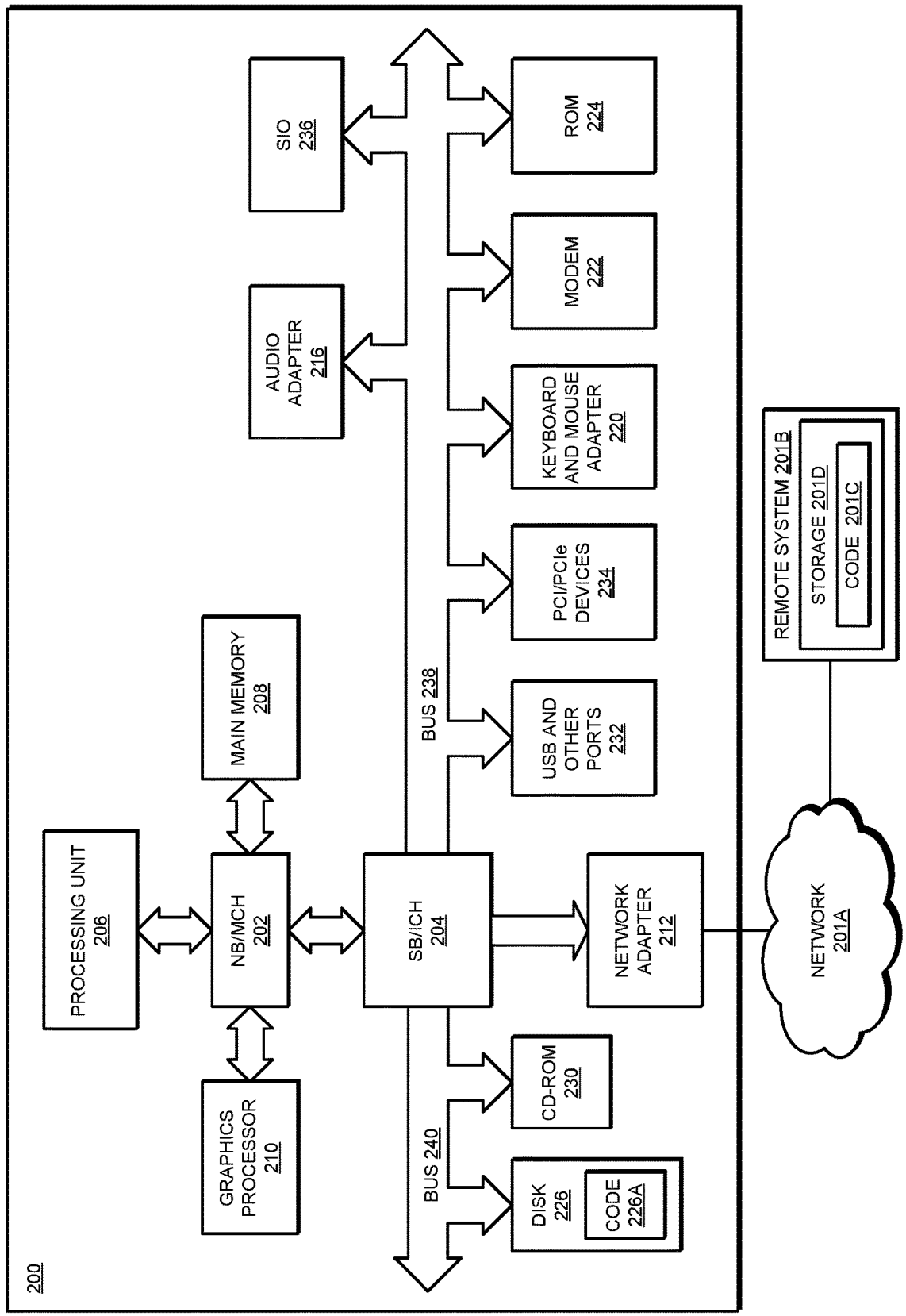
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Search engine 107 is an example search engine or search algorithm that is used for obtaining a result set as described herein. Search engine 103 may be a separate pre-implemented search engine or a search algorithm implemented in or with application 105. Interface 134 is a user interface, which is usable to allow a user to input an NL query, to capture an NL query from a natural language conversation, and interact with application 105 such as to receive re-ranked results, as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
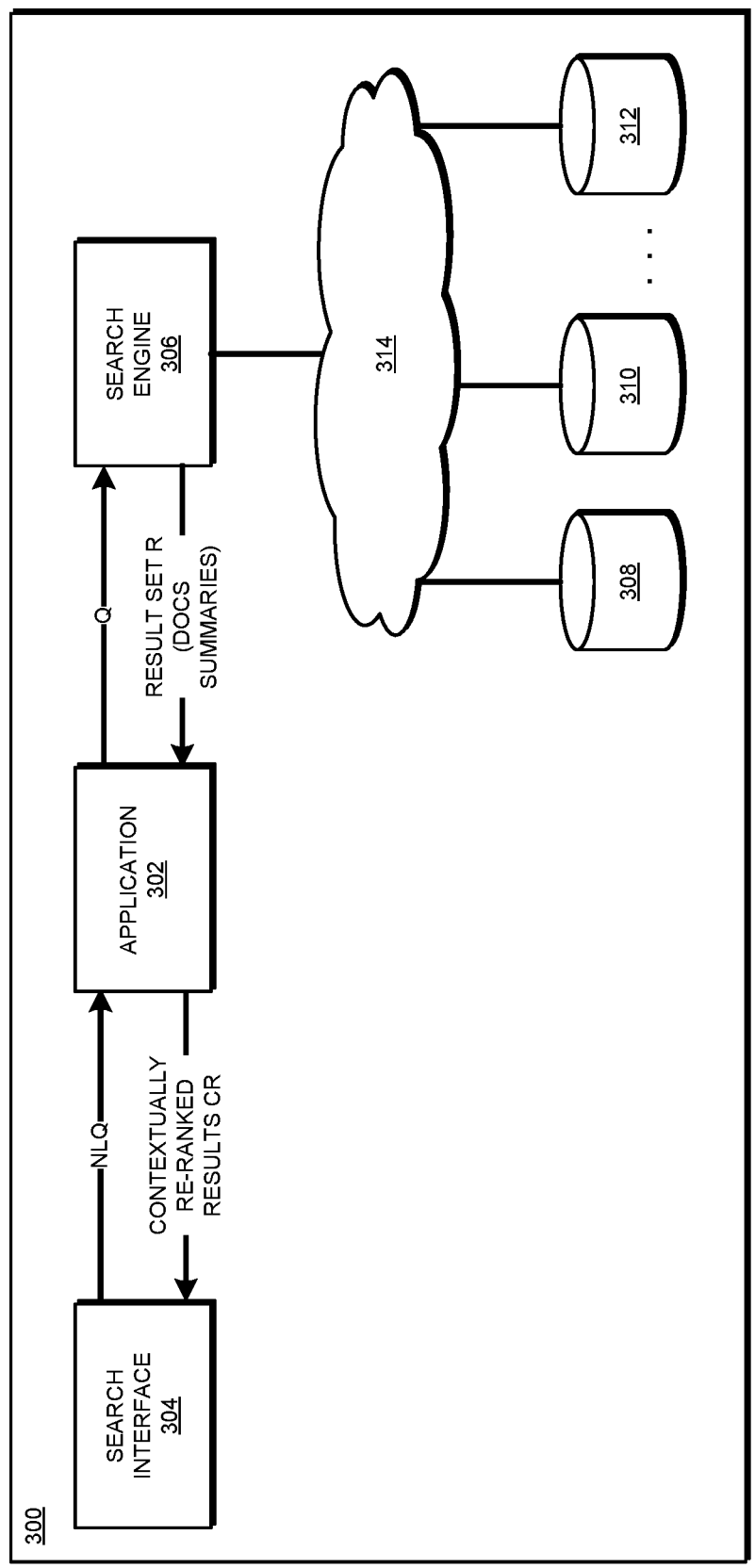
FIG. 3 depicts a block diagram of an example configuration for document ranking by contextual vectors from natural language query in accordance with an illustrative embodiment.

With reference to FIG. 3, this figure depicts a block diagram of an example configuration for document ranking by contextual vectors from natural language query in accordance with an illustrative embodiment. Application 302 is an example of application 105 in FIG. 1. Interface 304 is an example of interface 134 in FIG. 1. Search engine 306 is an example of search engine 107 in FIG. 1.

Interface 304 supplies NL query NLQ to application 302. Application 302 supplies query Q to search engine 306, which obtains a result set from any number of data sources, such as data sources 308, 310, and 312, over network 314. Application 302 obtains result set R from search engine 306. Query Q may be formed from NL query NLQ as described herein.

Figure 4:
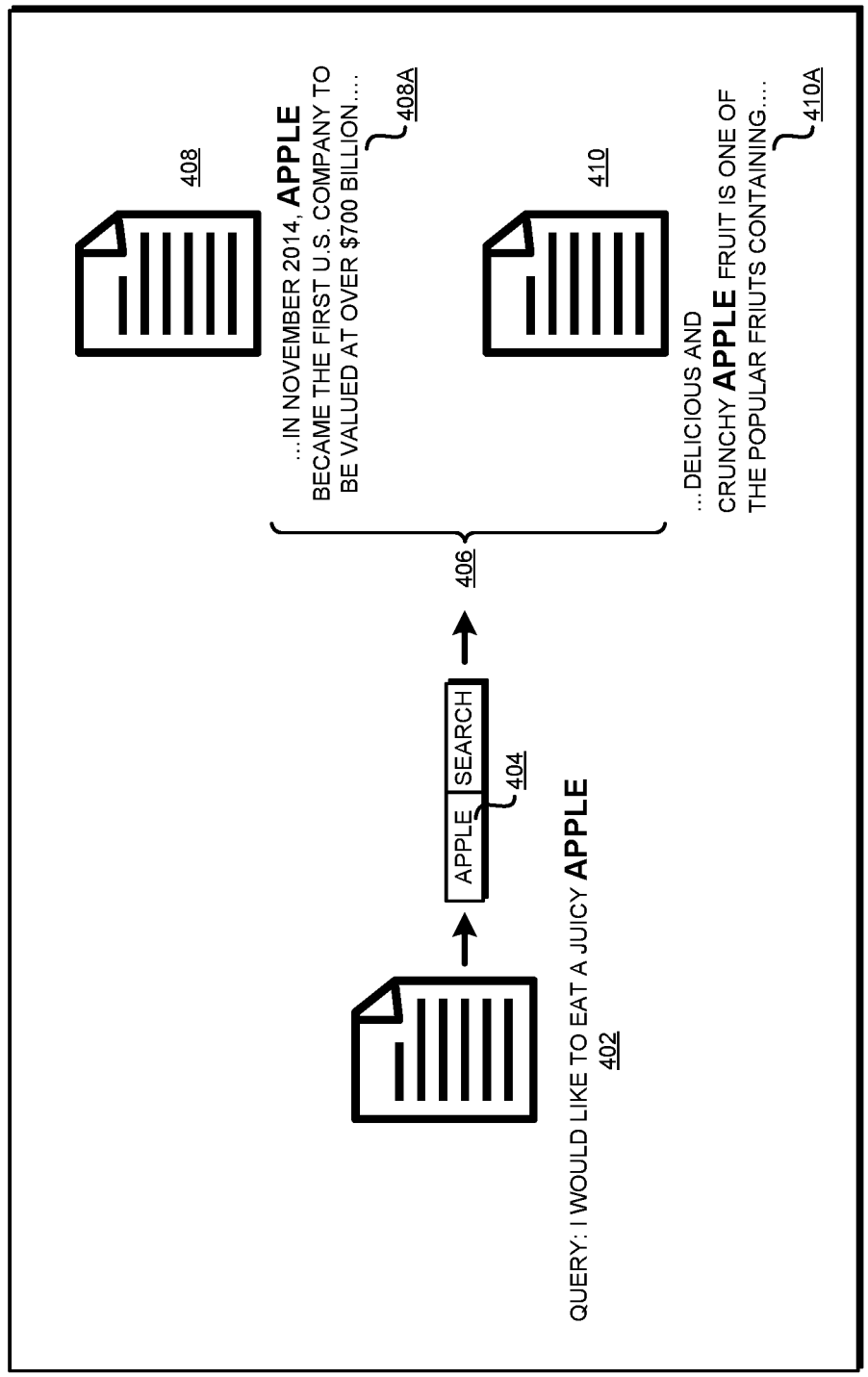
FIG. 4 depicts a block diagram of a problem with prior-art search and document ranking that can be remedied using an illustrative embodiment.

By processing result set R as described herein, application 302 produces contextually re-ranked result set CR With reference to FIG. 4, this figure depicts a block diagram of a problem with prior-art search and document ranking that can be remedied using an illustrative embodiment. For example, search engine 107 operating alone and without the benefit of application 105 in FIG. 1 would take keyword "apple" from query 402: "I would like to eat a juicy apple" and construct search string 404: "apple". Searching using search string 404, the search engine would produce result set 406, which would include results 408 and 410. Result 408 would be included in result set 406 because of text 408A in result 408 including search string 404. Result 410 would be included in result set 406 because of text 410A in result 408 including search string 404.

As a human can comprehend, result 408 is unhelpful in query 402 but result 410 is relevant to query 402. If is quite likely that many more results similar to result 408 than result 410 exist in the result set. It is also likely that result 408 refers to "apple" numerous times in a manner similar to data 408A. Disadvantageously, it is quite likely that result 408 ranks high—at or near the top—in result set 406 even though result 408 is unhelpful to the user.

Figure 5:
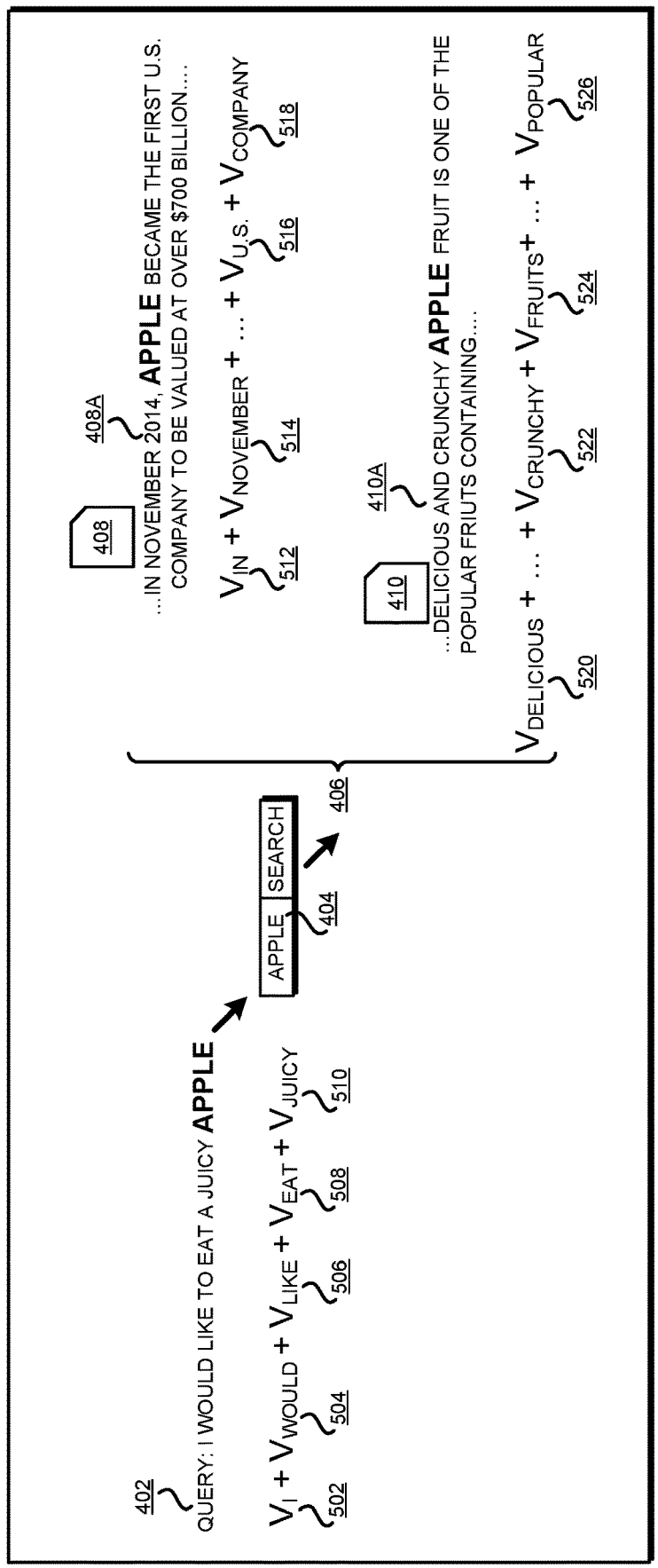
FIG. 5 depicts a block diagram of an example operation of a solution to the problem with prior-art search and document ranking in accordance with an illustrative embodiment.

With reference to FIG. 5, this figure depicts a block diagram of an example operation of a solution to the problem with prior-art search and document ranking in accordance with an illustrative embodiment. For example, application 105 in FIG. 1 parses NL query 402 into keyword 404 and some contextual words. Keyword 404 supplied to search engine 107 produces result set 406, which would include results 408 and 410.

In addition, the application uses NLP analysis of NL query 402 to produce a set of vectors 502, 504, 506, 508, and 510 using contextual words extracted from NL query 402. The application computes a score for each of vectors 502, 504, 506, 508, and 510 and performs vector aggregation as described herein.

Using NLP, the application analyzes data 408A for contextual words and produces a set of contextual vectors 512, 514, 516, and 518. The application scores and aggregates vectors 512, 514, 516, and 518. Similarly, the application analyzes data 410A for contextual words and produces a set of contextual vectors 520, 522, 524, and 526. The application scores and aggregates vectors 520, 522, 524, and 526.

The application performs an aggregated score comparison or another similarity analysis as described herein to determine a similarity value for result 408 and a similarity value for result 410 relative to the aggregated score of NL query 402. The similarity value of result 410 being higher than the similarity value of result 408, the application advantageously re-ranks result 410 higher than result 408.

Figure 6A:
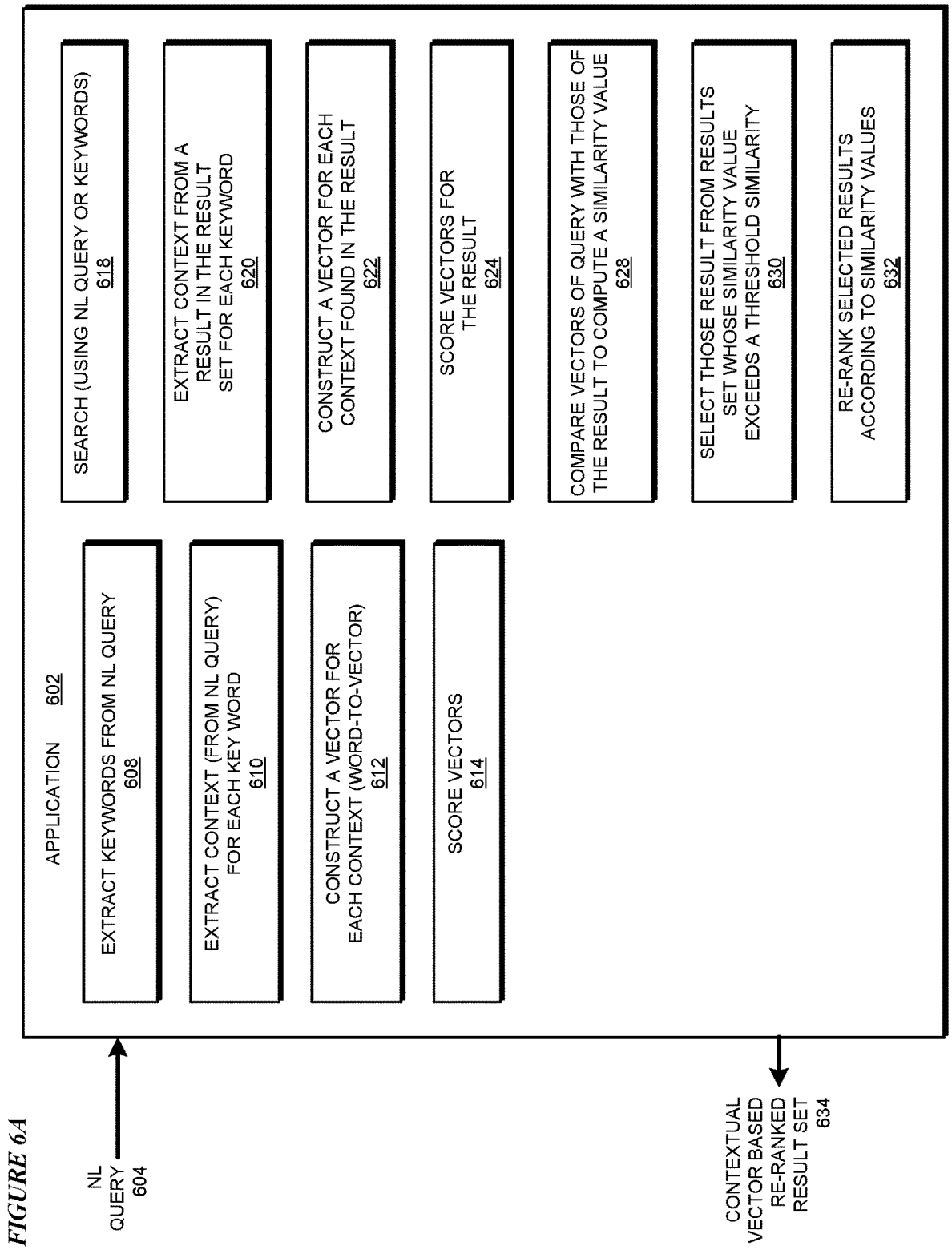
FIG. 6A depicts a block diagram of an application for document ranking by contextual vectors from natural language query in accordance with an illustrative embodiment.

With reference to FIG. 6A, this figure depicts a block diagram of an application for document ranking by contextual vectors from natural language query in accordance with an illustrative embodiment. Application 602 can be used as application 105 in FIG. 1. NL query 402 is an example of NL query 604.

Using an external NLP engine (not shown), or an implementation of an NLP engine (not shown) within application 402, component 608 extracts keywords or key phrases from NL query 604. Using NLP, component 610 extracts from NL query a set of one or more contextual words for each keyword or phrase. Component 612 constructs a vector for at least a subset of contextual words for a keyword or phrase. Component 614 scores the contextual word vectors.

Any number of keywords or phrases, or occurrences thereof, may be extracted from an NL query. Any number of contextual words may be associated with an occurrence of a keyword or phrase in the NL query. Any size or type of NL query may be processed in this manner.

Component 618 performs, or instructs a search engine to perform, a search using an extracted keyword or phrase. Using NLP, component 620 extracts a set of one or more contextual words for an occurrence of a keyword in a result in the result set of the search.

Component 622 constructs a vector for at least a subset of contextual words extracted for a keyword or phrase. Component 624 scores the contextual word vectors from the result.

Any number of keywords or phrases, or occurrences thereof, may be extracted from a result. Any number of contextual words may be associated with an occurrence of a keyword or phrase in the result. Any number of results may be processed in this manner.

Component 628 compares or otherwise determines the degree of similarity between the contextual vector scores of various results with the aggregated contextual vector score of NL query 604. Component 628 computes a similarity value for at least a subset of the result set in this manner.

Depending upon the implementation, component 630 selects some results that have a similarity value exceeding a similarity threshold, or selects all results that have a similarity value. Component 632 re-ranks the selected results according to their respective similarity values. Application outputs contextual vector based re-ranked result set, or a portion thereof.

Figure 6B:
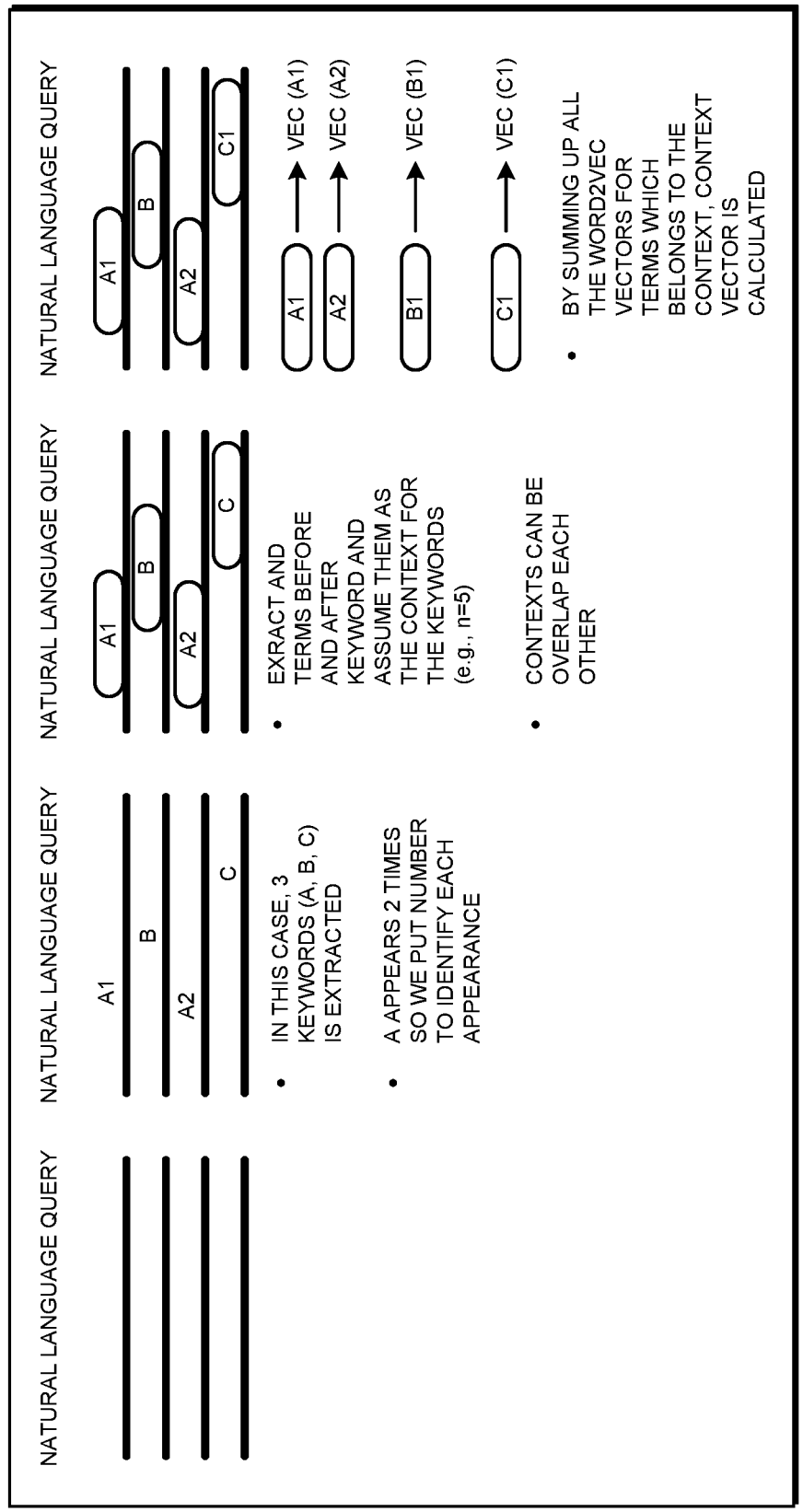
FIGS. 6B, 6C, and 6D depict an example operation for document ranking by contextual vectors from natural language query in accordance with an illustrative embodiment.
Figure 6C:
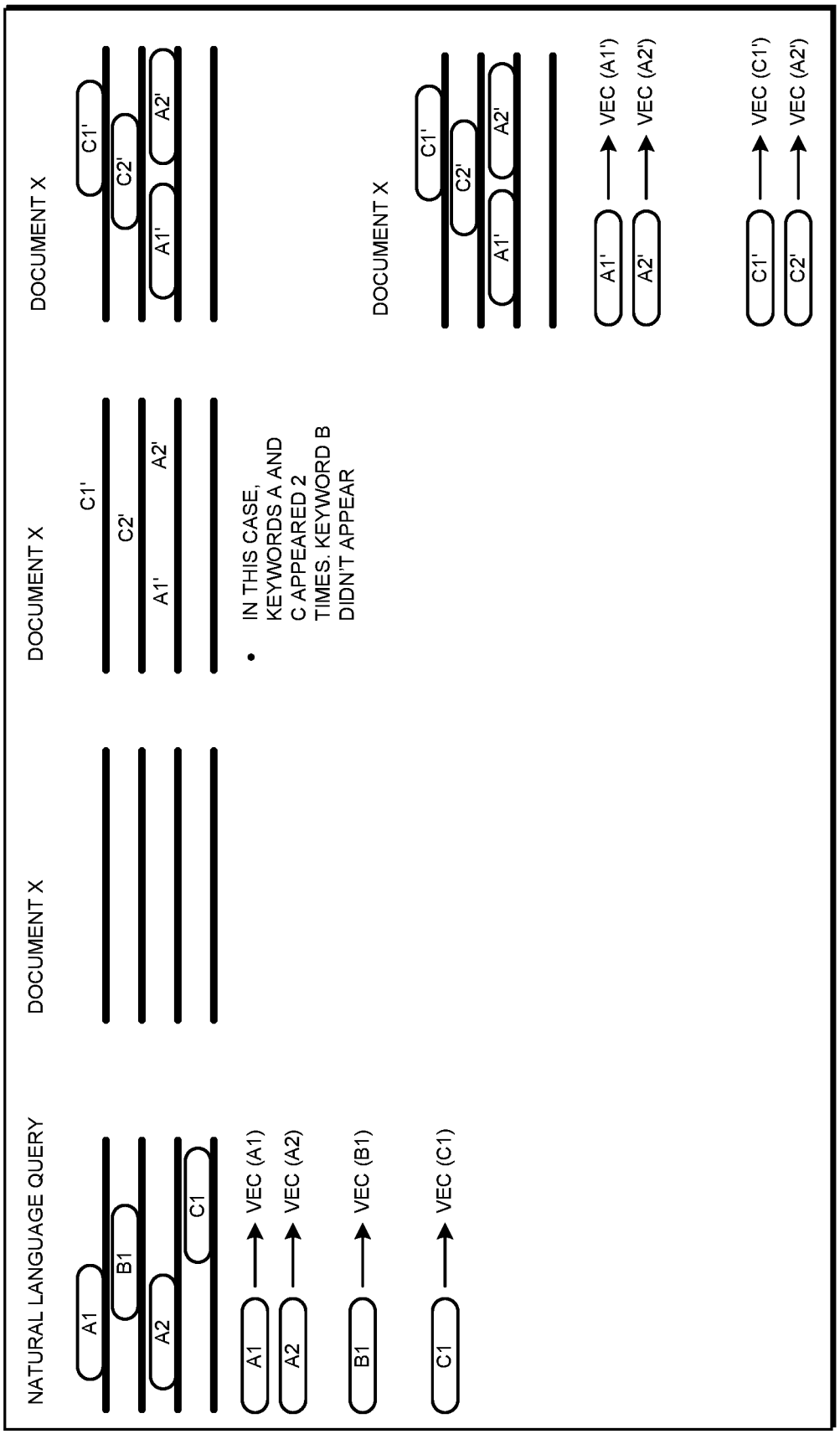
Figure 6D:
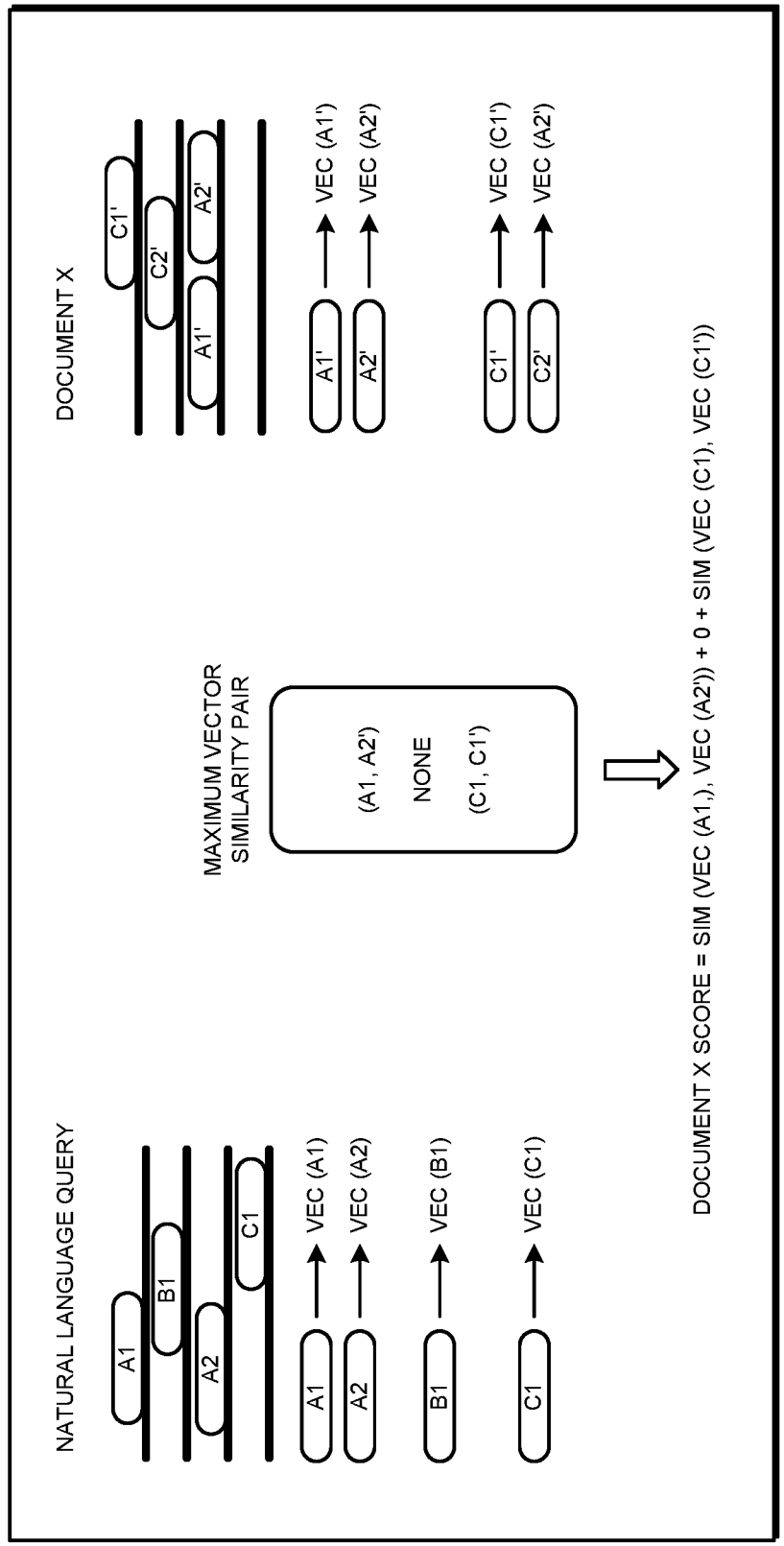

With reference to FIGS. 6B, and 6D, these figures depict an example operation for document ranking by contextual vectors from natural language query in accordance with an illustrative embodiment. An example NL query is depicted with example instances of keywords A, B, and C. Context vector formation is performed as described herein from the NL query for such keywords. An example result—"Document X" is obtained in response to a search. Keyword instances A and C are detected therein. Context vectors for the detected keyword instances are formed from the result, as described herein. Context vectors of the same or similar keywords are compared for similarities, and a document similarity score—Document X score—is computed in a non-limiting example manner, as described herein. The result—Document X—is then scored (not shown) using this score.

It is important to note that many techniques exist for using vectors to calculate similarity between a query and a document, e.g. doc2vec, tf-idf weighted sum of word2vec methods. However, disadvantageously, these techniques compare a single vector that represents an entire query with a single vector that represents an entire document. This type of coarse comparison is insufficient and inaccurate for determining contextual relevance of the results with an NL query. Single vector comparisons, as in these techniques, cannot detect subtle contextual nuances or phrase, especially when a result document, the NL query, or both exceed a certain size of complexity.

The illustrative embodiments construct detailed contextual vectors to compare detailed local information of an NL query and a result document. The illustrative embodiments generate context vector per keyword appearance and compute the vector similarity per context per keyword instance.

Figure 7:
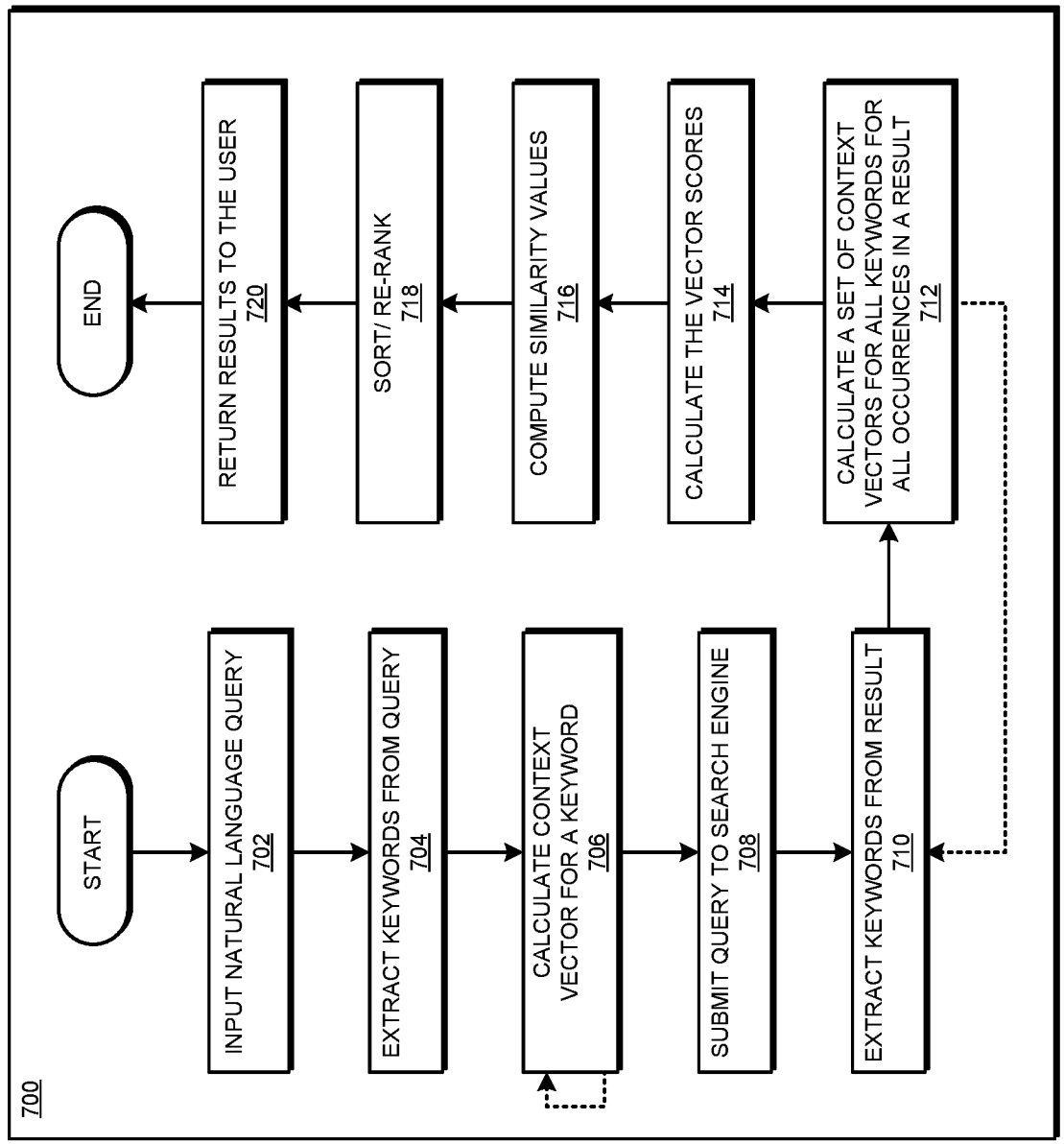
FIG. 7 depicts a flowchart of an overall process for document ranking by contextual vectors from natural language query in accordance with an illustrative embodiment.

With reference to FIG. 7, this figure depicts a flowchart of an overall process for document ranking by contextual vectors from natural language query in accordance with an illustrative embodiment. Process 700 can be implemented in application 602 in FIG. 6.

The application accepts as input an NL query (block 702). The application extracts a set of keywords or phrases from the NL query (block 704). The application extracts a set of contextual words for a keyword or phrase and computes a context vector for each context word (block 706). Block 706 repeats for as many keywords and their instances/occurrences as may have to be processed from the NL query.

The application submits all or a portion of the NL query for search (block 708). The application extracts a set of keywords or phrases, and some or all instances thereof from a result (block 710). The application computes a set of context vectors for the extracted keywords/phrases and their instances (block 712). Blocks 710 and 712 repeat for as many results as may have to be processed in this manner.

The application computes vector scores for the context vectors in the results of the result set (block 714). The application computes aggregate scores and contextual vectors based similarly values for the results (block 716). The application selects at least some of the results, and re-ranks the selected results according to their similarity values (block 718). The application outputs the contextual vector based re-ranked results to the user (block 720). The application ends process 700 thereafter.

Figure 8:
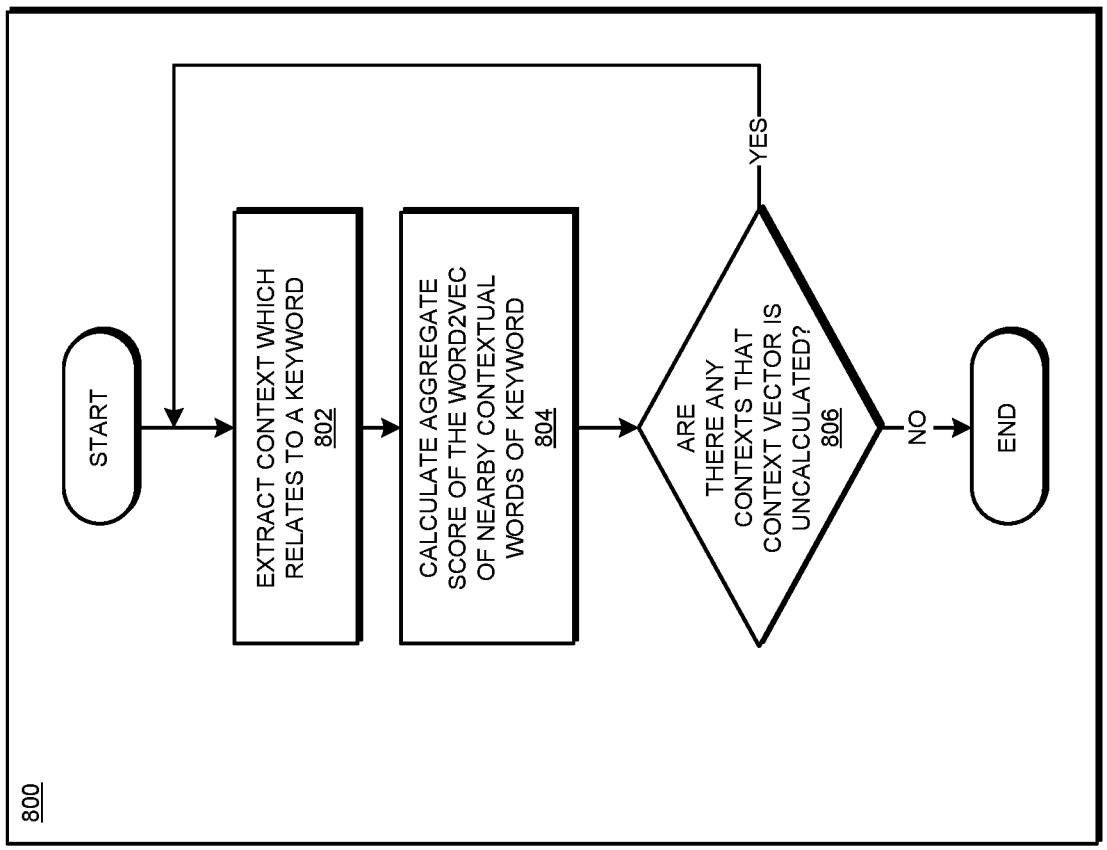
FIG. 8 depicts an example manner of vectorizing contexts of words in a NL query in accordance with an illustrative embodiment.

With reference to FIG. 8, this figure depicts an example manner of vectorizing contexts of words in a NL query in accordance with an illustrative embodiment. Process 800 is a non-limiting method of vectorization, and can be implemented as blocks 706 and 712 in FIG. 7.

The application extracts, e g, through NLP, a context that relates to a keyword in an NL query (block 802). The application computes and aggregates scores of vectors of words that are contextually near or related to a keyword in the NL query (block 804). If more contexts exist for the keyword for which word vectors and their scores have to be computed ("Yes" path go block 806), the application returns process 800 to block 802. If no more contexts exist for the keyword for which word vectors and their scores have to be computed ("No" path go block 806), the application ends process 800 thereafter.

Figure 9:
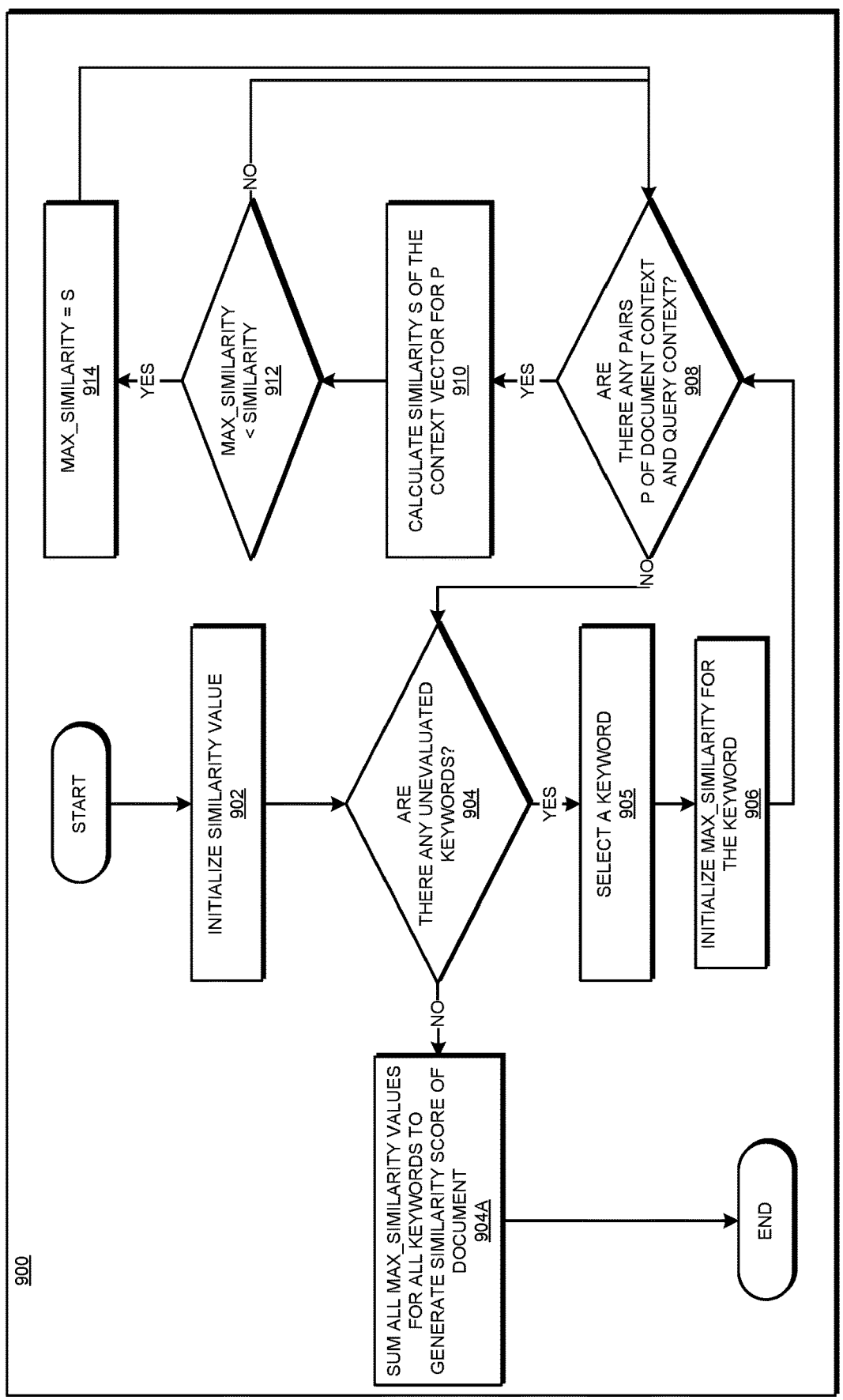
FIG. 9 depicts a flowchart of an example process for computing a similarity value of a result in accordance with an illustrative embodiment.

With reference to FIG. 9, this figure depicts a flowchart of an example process for computing a similarity value of a result in accordance with an illustrative embodiment. Process 900 can be implemented as block 716 in FIG. 7.

The application initializes a similarity value of a result (block 902). If no contextual scores for any keywords instances in the result remain to be evaluated ("No" path of block 904), the application sums up all the max-similarity values computed thus far in through process 900 for any keywords (block 904A). The application ends process 900 thereafter. If at least some contextual scores for some keywords instances in the result remain to be evaluated ("Yes" path of block 904), the application selects a keyword (block 905). The application initializes a max_similarity value for the keyword (block 906).

If no contextual vector exists in the result that matches, at least within a tolerance, with a contextual vector in the NL query ("No" path of block 908), the application returns to block 904.

If a contextual vector exists in the result that matches, at least within a tolerance, with a contextual vector in the NL query ("Yes" path of block 908), the application calculates a similarity between the vectors (block 910). If the calculated similarity value is greater than the max_similarity value ("Yes" path of block 912), the application sets the max_similarity value to the calculated similarity value (block 914), and returns to block 908. If the calculated similarity value is not greater than the max_similarity value ("No" path of block 912), the application returns to block 908.

Thus, a computer implemented method, system or apparatus, and computer program product are provided in the illustrative embodiments for document ranking by contextual vectors from natural language query and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
extracting a set of keywords from a query;
performing, for a keyword in the set of keywords, Natural Language Processing (NLP) on the query to extract a set of contextual words from the query;
computing, for the query, using a processor and a memory, a first score of a first vector, wherein the first vector represents a first contextual word in the set of contextual words, wherein a contextual word in the set of contextual words operates as a reference to a subject-matter domain in which a meaning of the keyword is intended;
performing a search using the keyword;
obtaining, responsive to the search, the result set;
analyzing, to detect the keyword therein, a first result in the result set, the keyword comprising a subset of the first result;
constructing, in the first result, a first result context in a set of result contexts, each of the set of result contexts comprising a context of the keyword within the result, each of the set of result contexts comprising less than the entirety of the first result;
computing, for the first result, a first result score of a first result vector, wherein the first result vector represents the first result context;
computing, using the first score and the first result score, a first result similarity value for the first result; and
re-ranking, according to the first result similarity value for the first result and a second result similarity value for a second result in the result set, the first result relative to the second result.

2. The method of claim 1, wherein the re-ranking places the first result in a different order relative to the second result as compared to an ordering of the first result and the second result in the result set.

3. The method of claim 1, wherein computing the first result score comprises:
computing by comparing the first vector with the first result vector, a first similarity value corresponding to the keyword; and
computing to form the first result score, a total of a set of all similarity values computed for the first result, the set of similarity values including the first similarity value.

4. The method of claim 1, wherein the first result comprises an entire document.

5. The method of claim 1, wherein the first result comprises a summarized version of a document.

6. The method of claim 1, wherein the first vector represents multiple contextual words, the multiple contextual words including the first contextual word.

7. The method of claim 1, further comprising:
computing a vector representation of the first contextual word to form the first vector, wherein the first vector represents the word using a set of numeric values.

8. The method of claim 1, wherein a contextual word in the set of contextual words is adjacent to the keyword.

9. The method of claim 1, wherein at least one intervening word appears between a contextual word in the set of contextual words and the keyword.

10. The method of claim 1, wherein the query comprises a natural language sentence according to a grammar of a language.

11. The method of claim 1, further comprising: subjecting the query to NLP as a part of extracting the set of keywords.

12. The method of claim 1, wherein the set of keywords comprises a multi-word phrase.

13. The method of claim 1, further comprising:
detecting a non-search related natural language conversation; and
selecting a portion of data of the conversation as the query.

14. The method of claim 13, wherein the data of the conversation comprises audio data.

15. The method of claim 13, wherein the data of the conversation comprises text.

16. A computer usable program product comprising one or more computer-readable storage devices, and program instructions stored on at least one of the one or more storage devices, the stored program instructions comprising:
program instructions to extract a set of keywords from a query;
program instructions to perform, for a keyword in the set of keywords, Natural Language Processing (NLP) on the query to extract a set of contextual words from the query;
program instructions to compute, for the query, using a processor and a memory, a first score of a first vector, wherein the first vector represents a first contextual word in the set of contextual words, wherein a contextual word in the set of contextual words operates as a reference to a subject-matter domain in which a meaning of the keyword is intended;
program instructions to perform a search using the keyword;
program instructions to obtain, responsive to the search, the result set;
program instructions to analyze, to detect the keyword therein, a first result in the result set, the keyword comprising a subset of the first result;
program instructions to construct, in the first result, a first result context in a set of result contexts, each of the set of result contexts comprising a context of the keyword within the result, each of the set of result contexts comprising less than the entirety of the first result;
program instructions to compute, for the first result, a first result score of a first result vector, wherein the first result vector represents the first result context;
program instructions to compute, using the first score and the first result score, a first result similarity value for the first result; and
program instructions to re-rank, according to the first result similarity value for the first result and a second result similarity value for a second result in the result set, the first result relative to the second result.

17. The computer usable program product of claim 16, wherein the computer usable code is stored in a computer readable storage device in a data processing system, and wherein the computer usable code is transferred over a network from a remote data processing system.

18. The computer usable program product of claim 16, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to extract a set of keywords from a query;
program instructions to perform, for a keyword in the set of keywords, Natural Language Processing (NLP) on the query to extract a set of contextual words from the query;
program instructions to compute, for the query, using a processor and a memory, a first score of a first vector, wherein the first vector represents a first contextual word in the set of contextual words, wherein a contextual word in the set of contextual words operates as a reference to a subject-matter domain in which a meaning of the keyword is intended;
program instructions to perform a search using the keyword;
program instructions to obtain, responsive to the search, the result set;
program instructions to analyze, to detect the keyword therein, a first result in the result set, the keyword comprising a subset of the first result;
program instructions to construct, in the first result, a first result context in a set of result contexts, each of the set of result contexts comprising a context of the keyword within the result, each of the set of result contexts comprising less than the entirety of the first result;
program instructions to compute, for the first result, a first result score of a first result vector, wherein the first result vector represents the first result context;
program instructions to compute, using the first score and the first result score, a first result similarity value for the first result; and
program instructions to re-rank, according to the first result similarity value for the first result and a second result similarity value for a second result in the result set, the first result relative to the second result.

* * * * *